No. 758,397. PATENTED APR. 26, 1904.
L. T. WEISS.
SHIFTING SEGMENTAL BUSHING FOR CRANK BEARINGS.
APPLICATION FILED AUG. 5, 1903.
NO MODEL.
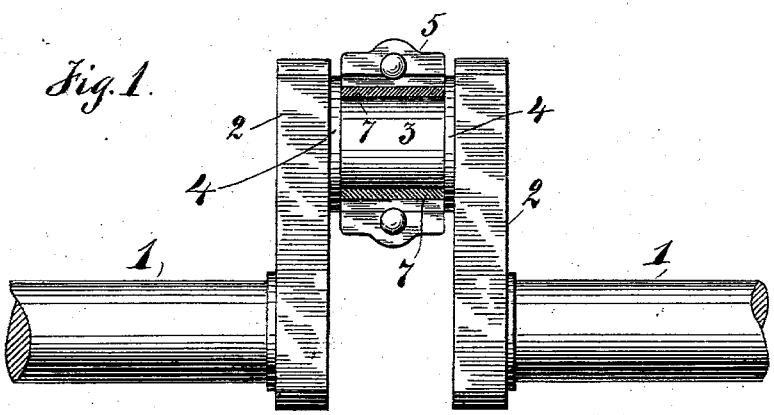
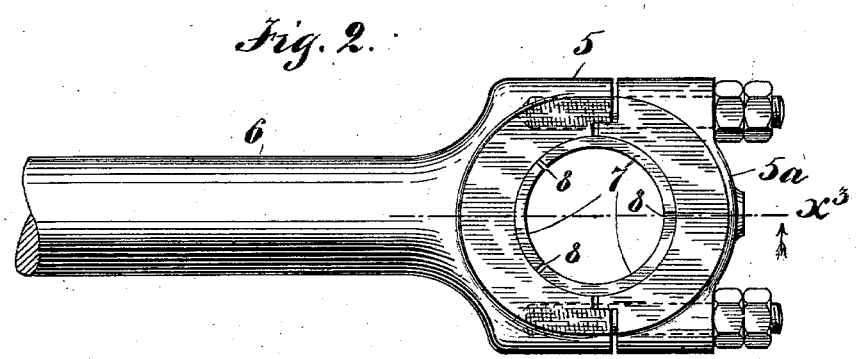
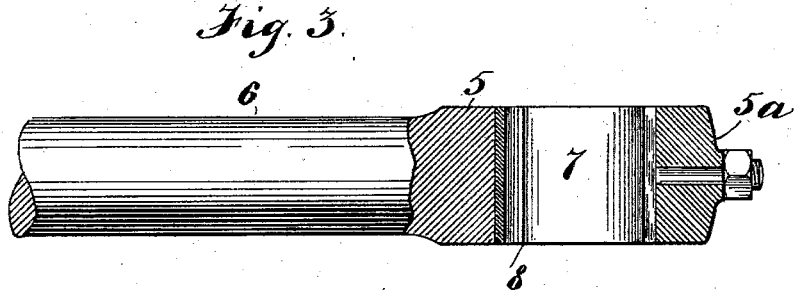
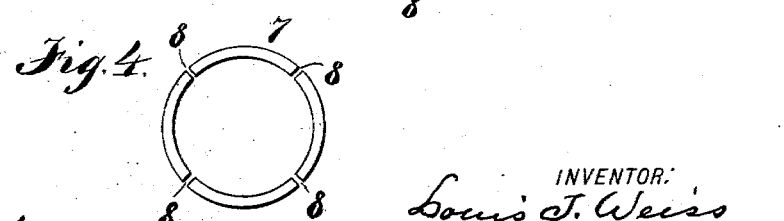
WITNESSES:
INVENTOR:
Louis T. Weiss
BY
Henry Connett
ATTORNEY No. 758,397.

Patented April 26, 1904.

UNITED STATES PATENT OFFICE.

LOUIS T. WEISS, OF NEW YORK, N. Y.

SHIFTING SEGMENTAL BUSHING FOR CRANK-BEARINGS.

SPECIFICATION forming part of Letters Patent No. 758,397, dated April 26, 1904.

Application filed August 5, 1903. Serial No. 168,307. (No model.)

*To all whom it may concern:*

Be it known that I, LOUIS T. WEISS, a citizen of the United States, residing in the borough of Brooklyn, in the county of Kings and city and State of New York, have invented certain new and useful Improvements in Shifting Segmental Bushings for Crank-Bearings, of which the following is a specification.

This invention relates to a bushing embraced between the crank pin or wrist and the head of the connecting-rod; and it has for its object to provide such a bushing which shall be of two or more segments of uniform thickness and having the same length as the crank-wrist. The three segments when fitted together embrace a little less than the entire circumference of the wrist, whereby spaces are formed between their adjacent edges to receive a lubricant.

In the accompanying drawings, which serve to illustrate an embodiment of the invention, Figure 1 is a view of a crank with the invention applied thereto. The cap of the connecting-rod head is omitted, and the shifting bushing is seen in section. Fig. 2 is a side elevation of the connecting-rod head detached, and Fig. 3 is a section at the line $x^3$ in Fig. 2. Fig. 4 is an end view of the bushing detached, showing it composed of four segments.

1 designates a shaft in which is formed a crank 2, having a wrist or crank pin 3. Between the shoulders 4 4 on the crank pin or wrist 3 the latter is embraced by the head 5 of a connecting-rod 6. This head has a cap $5^a$, secured in place by nuts and screws in a known way.

The above-described features are well-known mechanical devices.

In constructing the head of the connecting-rod it is bored out to receive a bushing 7, which fits snugly but freely internally about the wrist 3 and fits sugly but freely externally in the bore of the head 5. Lengthwise it fits snugly but freely between the faces of the shoulders 4 on the wrist 3. This particular bushing is formed of three segments, the lateral edges of which are normally slightly separated, as seen at 8, to provide receptacles for lubricating material. The bushing is of uniform thickness throughout. When the crank turns, the wrist rotates axially and the bushing rotates in the head of the connecting-rod, thereby reducing the surface speed to one-half and making the running-surface as large again as when no bushing is used, thus preventing the bearing from getting hot.

This bushing by running inside the head of the connecting-rod and about the wrist distributes the wear evenly and prolongs the life of the joint. It is very advantageous in internal-combustion engines, where the effect of the explosion of the forward stroke of the piston and the compression on the reverse stroke keeps a heavy pressure against the crank wrist or pin in the same direction at all times, and this constant pressure prevents the lubricant from getting to the place where it is most needed. The shifting of the segments of the bushing to a slight extent independently of each other will vary the width of the spaces 8, sometimes closing one and opening another, according to circumstances, and these spaces will carry the lubricant and positively distribute it, which is a matter of great importance.

In Fig. 4 the bushing is shown as made up of four segments.

Having thus described my invention, I claim—

1. In a device for the purpose specified, the combination with a shouldered journal having a part with a bearing embracing and continuously rotating about said journal, of the rotatable bushing made up of a plurality of segments interposed between said journal and bearing part, said bushing being embraced endwise between shoulders on the journal and having lubricant-spaces between the lateral edges of its segments.

2. In a device for the purpose specified, the combination with the shaft, provided with the crank and shouldered crank-pin, and a connecting-rod having a head with a bearing to embrace said crank-pin, of the rotatable bushing 7, composed of a plurality of segments embracing internally the crank-pin within said bearing and being externally embraced by the bearing in the head, and said bushing having a plurality of lubricant-spaces and fitting snugly endwise between the embracing shoulders on the crank.

3. In a device for the purpose specified, the combination with a shouldered journal having a part with a bearing embracing and continuously rotating about said journal, of a rotatable segmental bushing having a cylindrical form both internally and externally, said bushing being embraced endwise between the shoulders on the journal and being disposed in the annular space between the journal and the bearing.

In witness whereof I have hereunto signed my name, this 29th day of July, 1903, in the presence of two subscribing witnesses.

LOUIS T. WEISS.

Witnesses:
  H. G. CONNETT,
  BENJAMIN H. HOLT.